(12) United States Patent
Li et al.

(10) Patent No.: US 10,073,983 B1
(45) Date of Patent: Sep. 11, 2018

(54) SYSTEMS AND METHODS FOR IDENTIFYING SUSPICIOUS SINGLETON FILES USING CORRELATIONAL PREDICTORS

(71) Applicant: Symantec Corporation, Mountain View, CA (US)

(72) Inventors: Bo Li, Nashville, TN (US); Kevin Alejandro Roundy, El Segundo, CA (US); Christopher Gates, Culver City, CA (US)

(73) Assignee: Symantec Corporation, Mountain View, CA (US)

(*) Notice: Subject to any disclaimer, the term of this patent is extended or adjusted under 35 U.S.C. 154(b) by 151 days.

(21) Appl. No.: 14/966,502

(22) Filed: Dec. 11, 2015

(51) Int. Cl.
*G06F 21/62* (2013.01)
*G06F 21/56* (2013.01)

(52) U.S. Cl.
CPC ........ *G06F 21/6218* (2013.01); *G06F 21/565* (2013.01)

(58) Field of Classification Search
None
See application file for complete search history.

(56) References Cited

U.S. PATENT DOCUMENTS

| | | | |
|---|---|---|---|
| 5,519,865 A * | 5/1996 | Kondo | G06F 17/30067 |
| 8,402,545 B1 * | 3/2013 | Chen | G06F 21/56 726/24 |
| 8,769,685 B1 | 7/2014 | Conrad et al. | |
| 2006/0037080 A1 * | 2/2006 | Maloof | G06F 21/562 726/24 |
| 2009/0013405 A1 | 1/2009 | Schipka | |
| 2013/0305368 A1 * | 11/2013 | Ford | G06F 21/568 726/23 |
| 2014/0090061 A1 | 3/2014 | Avasarala et al. | |

(Continued)

OTHER PUBLICATIONS

Bo Li, et al; Systems and Methods for Identifying Potentially Malicious Singleton Files; U.S. Appl. No. 15/071,049, filed Mar. 15, 2016.

(Continued)

*Primary Examiner* — Joseph P Hirl
*Assistant Examiner* — Hassan Saadoun
(74) *Attorney, Agent, or Firm* — FisherBroyles, LLP

(57) ABSTRACT

The disclosed computer-implemented method for identifying suspicious singleton files using correlational predictors may include (1) identifying a set of known-clean computing devices that include no singleton files, (2) detecting at least one software component that is installed on a threshold number of the known-clean computing devices, (3) identifying an unvindicated computing device whose infection status is unknown, (4) determining that, in addition to being installed on the threshold number of known-clean computing devices, the software component is installed on the unvindicated computing device, (5) determining that the unvindicated computing device includes at least one singleton file, and then (6) classifying the singleton file as suspicious in response to determining that (A) the software component is installed on the unvindicated computing device and (B) the unvindicated computing device includes the singleton file. Various other methods, systems, and computer-readable media are also disclosed.

20 Claims, 6 Drawing Sheets

(56) References Cited

U.S. PATENT DOCUMENTS

2015/0007319 A1      1/2015   Antonov et al.
2015/0172303 A1*   6/2015   Humble ............. H04L 63/1408
                                                             726/23

OTHER PUBLICATIONS

Sutskever, Ilya et al., "Generating Text with Recurrent Neural Networks", http://www.cs.utoronto.ca/~ilya/pubs/2011/LANG-RNN.pdf, as accessed Feb. 10, 2016, Proceedings of the 28th International Conference on Machine Learning, Bellevue, WA, (2011).

* cited by examiner

```
                          Regular Expression
                                 400

---------------------------------------------------------------
***********************************************

(_ASP|.NET|APP_CODE|APP_GlobalResources|APP_LocalResources|APP_Web|aspx)

***********************************************
---------------------------------------------------------------
```

```
                         Singleton File Information
                                    402

---------------------------------------------------------------
***********************************************

FILE: Singleton File 222

FILE NAME: App_Web_example.dfa854d52701.exe

FILE PATH: C:\WINDOWS\Microsoft.NET\Framework\v4.0.30319\APP_CODE\

SYSTEMS AND METHODS FOR IDENTIFYING SUSPICIOUS SINGLETON FILES USING CORRELATIONAL PREDICTORS

BACKGROUND

Singleton files often represent a large portion of the files encountered by security software vendors. In this context, a singleton may refer to a file that exists exclusively on a single computing device. Many targeted computing threats exist as singleton files. Unfortunately, since singletons are found only on a single computing device, traditional computer security technologies may have difficulty identifying those singletons that are suspicious and/or malicious.

As an example, a security software vendor may be tasked with protecting its customer base from computing threats. Over the course of a year, the security software vendor may encounter 10 billion files in its security efforts. In this example, 9 billion of those files may represent singletons (or at least appear as such to the security software vendor). Unfortunately, many of the security software vendor's threat-detection techniques may be ineffective at identifying which of those 9 billion singletons are malicious. For example, malicious singletons may fail to match any of the security software vendor's virus signatures due to the singletons' unique file hashes. Additionally or alternatively, the security software vendor's reputation service may be unable to determine the reputation of malicious singletons due to a lack of telemetry data.

The instant disclosure, therefore, identifies and addresses a need for improved systems and methods for identifying suspicious singleton files using correlational predictors.

SUMMARY

As will be described in greater detail below, the instant disclosure describes various systems and methods for identifying suspicious singleton files using correlational predictors. In one example, a computer-implemented method for identifying suspicious singleton files using correlational predictors may include (1) identifying a set of known-clean computing devices that include no singleton files, (2) detecting at least one software component that is installed on a threshold number of the known-clean computing devices, (3) identifying an unvindicated computing device whose infection status is unknown, (4) determining that, in addition to being installed on the threshold number of known-clean computing devices, the software component is installed on the unvindicated computing device, (5) determining that the unvindicated computing device includes at least one singleton file, and then (6) classifying the singleton file as suspicious in response to determining that (A) the software component is installed on the unvindicated computing device and (B) the unvindicated computing device includes the singleton file.

In one example, the method may also include identifying an additional set of known-clean computing devices that include a plurality of singleton files. In this example, the method may further include detecting whether the software component is installed on any of the known-clean computing devices that include the plurality of singleton files. Additionally or alternatively, the method may include calculating a ratio between the set of known-clean computing devices on which the software component is installed and the additional set of known-clean computing devices on which the software component is installed. This ratio may represent the likelihood of finding the software component installed on clean computing devices that include no singleton files versus the likelihood of finding the software component installed on clean computing devices that include some singleton files. Finally, the method may include determining that the ratio has reached a certain threshold.

In one example, the method may also include determining, based at least in part on the software component being installed on the unvindicated computing device, that the unvindicated computing device is not expected to include any singleton files. In this example, the method may further include determining that the unvindicated computing device includes the singleton file even though the unvindicated computing device is not expected to include any singleton files.

In one example, the method may also include subjecting the singleton file to an increased level of scrutiny due at least in part to the singleton file's classification as suspicious. In this example, the method may further include identifying an additional set of known-clean computing devices that include a plurality of singleton files and then detecting at least one additional software component that is installed on a threshold number of the known-clean computing devices that include the plurality of singleton files. Additionally or alternatively, the method may include identifying an additional unvindicated computing device whose infection status is unknown and then determining that, in addition to being installed on the threshold number of known-clean computing devices that include the plurality of singleton files, the additional software component is installed on the additional unvindicated computing device. Finally, the method may include determining that the additional unvindicated computing device includes at least one additional singleton file and then, in response to determining that the additional unvindicated computing device includes the additional singleton file, performing at least one additional suspicion analysis on the additional singleton file to determine whether the additional singleton file is suspicious.

In one example, the method may also include identifying at least one attribute of the additional singleton file included on the additional unvindicated computing device. In this example, the method may further include determining whether the attribute of the additional singleton file matches at least one attribute of a cluster of benign singleton files that have been linked to the additional software component. Additionally or alternatively, the method may include determining that the attribute of the additional singleton file does not match the attribute of the cluster of benign singleton files and then classifying the additional singleton file as suspicious in response to determining that the attribute of the additional singleton file does not match the attribute of the cluster of benign singleton files.

In one example, the method may also include determining, based at least in part on the additional software component being installed on the additional unvindicated computing device, that the additional unvindicated computing device is expected to include only singleton files that have the attribute of the cluster of benign singleton files. In this example, the method may further include determining that the additional unvindicated computing device includes the additional singleton file even though the unvindicated computing device is expected to include only singleton files that have the attribute of the cluster of benign singleton files. Additionally or alternatively, the method may also include classifying the additional singleton file as suspicious due at least in part to the unvindicated computing device being expected to include only singleton files that have the attribute of the cluster of benign singleton files and the additional singleton file not having the attribute of the cluster of benign singleton files.

In one example, the method may also include determining that the attribute of the additional singleton file matches the attribute of the cluster of benign singleton files. In this example, the method may further include classifying the additional singleton file as benign in response to determining that the attribute of the additional singleton file matches the attribute of the cluster of benign singleton files. Examples of the attribute of the cluster of benign singleton files include, without limitation, a character string included in file names of the benign singleton files, a character string included in folder names in which the benign singleton files have been identified, a file size metric that represents sizes of the benign singleton files, variations or combinations of one or more of the same, or any other suitable attribute.

In one example, the method may further include creating a classifier that facilitates classifying singleton files as suspicious or benign by training the classifier with training data. In this example, the training data may represent and/or account for the software component being installed on the threshold number of known-clean computing devices that include no singleton files. Additionally or alternatively, the training data may represent and/or account for the additional software component being installed on the threshold number of known-clean computing devices that include the plurality of singleton files.

In one example, a system for implementing the above-described method may include (1) an identification module, stored in memory, that (A) identifies a set of known-clean computing devices that include no singleton files and (B) identifies an unvindicated computing device whose infection status is unknown, (2) a detection module, stored in memory, that detects at least one software component that is installed on a threshold number of the known-clean computing devices, (3) a determination module, stored in memory, that (A) determines that, in addition to being installed on the threshold number of known-clean computing devices, the software component is installed on the unvindicated computing device and (B) determines that the unvindicated computing device includes at least one singleton file, (4) a classification module, stored in memory, that classifies the singleton file as suspicious in response to determining that (A) the software component is installed on the unvindicated computing device and (B) the unvindicated computing device includes the singleton file, and (5) at least one physical processor configured to execute the identification module, the detection module, the determination module, and the classification module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) identify a set of known-clean computing devices that include no singleton files, (2) detect at least one software component that is installed on a threshold number of the known-clean computing devices, (3) identify an unvindicated computing device whose infection status is unknown, (4) determine that, in addition to being installed on the threshold number of known-clean computing devices, the software component is installed on the unvindicated computing device, (5) determine that the unvindicated computing device includes at least one singleton file, and then (6) classify the singleton file as suspicious in response to determining that (A) the software component is installed on the unvindicated computing device and (B) the unvindicated computing device includes the singleton file.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

FIG. 4 is an illustration of an exemplary regular expression and an exemplary singleton file.

Figure 1:
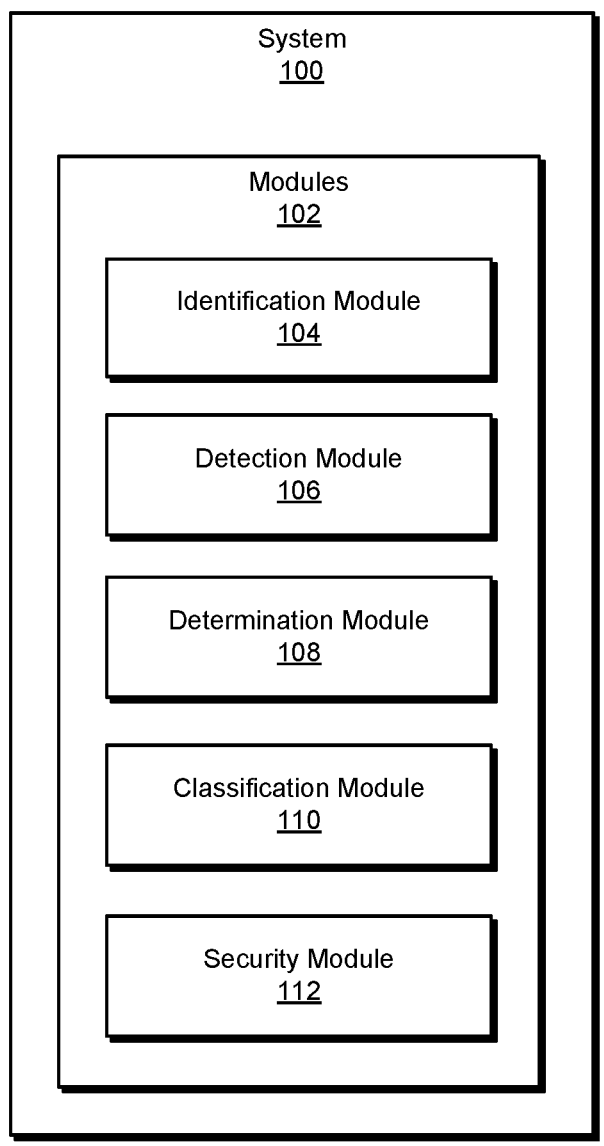
FIG. 1 is a block diagram of an exemplary system for identifying suspicious singleton files using correlational predictors.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for identifying suspicious singleton files using correlational predictors. As will be explained in greater detail below, by grouping together clean computing devices that include a lot of singleton files as well as clean computing devices that include no singleton files, the systems and methods described herein may be able to identify software components that are commonly installed on those computing devices that include a lot of singleton files as well as software components that are commonly installed on those computing devices that include no singleton files. The systems and methods described herein may then search for such software components on an unvindicated computing device within a security software vendor's customer base to determine whether the security software vendor expects to find any singleton files on that computing device.

On the one hand, in the event that the security software vendor detects a software component associated with no singleton files, the systems and methods described herein may not expect to find any singleton files on the unvindicated computing device. As a result, these systems and methods may classify any singleton files found on the unvindicated computing device as suspicious since no singleton files are expected there.

On the other hand, in the event that the security software vendor detects a software component associated with a lot of singleton files, the systems and methods described herein may expect to find some singleton files on the unvindicated computing device. As a result, these singleton files may not necessarily be suspicious unless further information indicates so. For example, the systems and methods described herein may determine whether such singleton files have certain attributes (such as file name features, folder name features, and/or file size) that correspond to a cluster of benign singleton files linked to that software component. If so, these systems and methods may expect to find those types of singletons on the unvindicated computing device and may thus classify those singletons as benign. If not, these systems and methods may not expect to find those types of singletons on the unvindicated computing device and may thus classify those singletons as suspicious.

Accordingly, these systems and methods may be able to filter out benign singleton files from the total set of singletons encountered by the security software vendor. In doing so, these systems and methods may reduce the number of singletons that warrant the most aggressive, resource-intensive, and/or time-intensive monitoring and/or examination. In other words, these systems and methods may be able to divert monitoring and/or processing resources (e.g., processing power and/or memory consumption) away from benign singleton files and/or toward suspicious singleton files in order to avoid wasting such resources.

Figure 2:
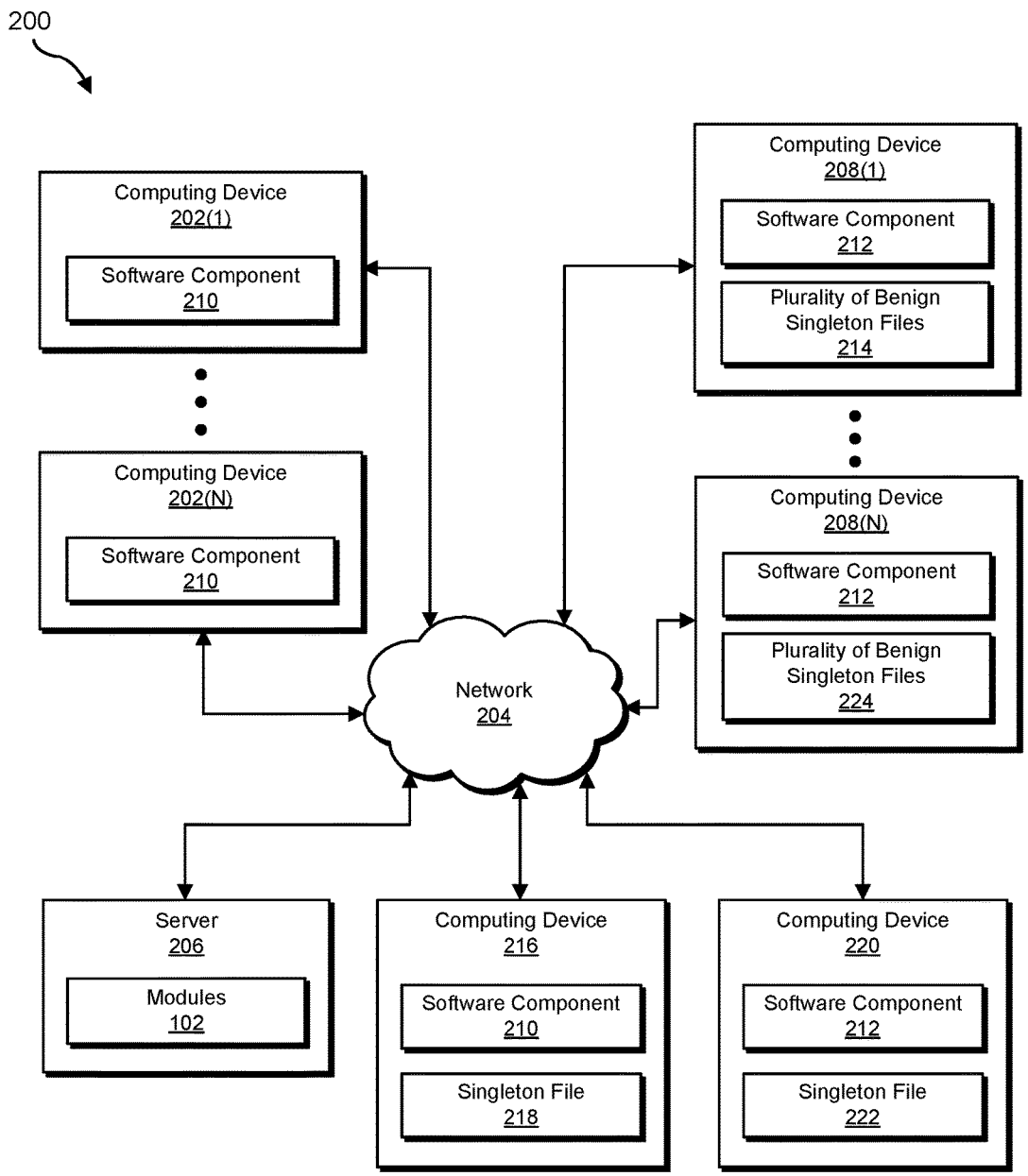
FIG. 2 is a block diagram of an additional exemplary system for identifying suspicious singleton files using correlational predictors.

The following will provide, with reference to FIGS. 1-2, detailed descriptions of exemplary systems for identifying suspicious singleton files using correlational predictors. Detailed descriptions of corresponding computer-implemented methods will be provided in connection with FIG. 3. Detailed descriptions of an exemplary bag of words and exemplary singleton file information will be provided in connection with FIG. 4. In addition, detailed descriptions of an exemplary computing system and network architecture capable of implementing one or more of the embodiments described herein will be provided in connection with FIGS. 5 and 6, respectively.

FIG. 1 is a block diagram of an exemplary system 100 for identifying suspicious singleton files using correlational predictors. As illustrated in this figure, exemplary system 100 may include one or more modules 102 for performing one or more tasks. For example, and as will be explained in greater detail below, exemplary system 100 may include an identification module 104 that (1) identifies a set of known-clean computing devices that include no singleton files and (2) identifies an unvindicated computing device whose infection status is unknown. Exemplary system 100 may also include a detection module 106 that detects at least one software component that is installed on a threshold number of known-clean computing devices.

In addition, and as will be described in greater detail below, exemplary system 100 may include a determination module 108 that (1) determines that, in addition to being installed on the threshold number of known-clean computing devices, the software component is installed on the unvindicated computing device and (2) determines that the unvindicated computing device includes at least one singleton file. Exemplary system 100 may also include a classification module 110 that classifies the singleton file as suspicious in response to those determinations. Although illustrated as separate elements, one or more of modules 102 in FIG. 1 may represent portions of a single module or application (e.g., a security software application).

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing devices 202(1)-(N), 208(1)-(N), 216, 220, and/or server 206), computing system 510 in FIG. 5, and/or portions of exemplary network architecture 600 in FIG. 6. One or more of modules 102 in FIG. 1 may also represent all or portions of one or more special-purpose computers configured to perform one or more tasks.

Exemplary system 100 in FIG. 1 may be implemented in a variety of ways. For example, all or a portion of exemplary system 100 may represent portions of exemplary system 200 in FIG. 2. As shown in FIG. 2, system 200 may include a network 204 that facilitates communication among computing devices 202(1)-(N), 208(1)-(N), 216, 220, and/or server 206. In one example, computing devices 202(1)-(N) may represent a group of known-clean devices that have never been infected by malware. In this example, computing devices 202(1)-(N) may exclude and/or be free of any singleton files. In addition, a threshold number of computing devices 202(1)-(N) may include and/or store a software component 210. Although FIG. 2 illustrates only computing devices 202(1)-(N) that include and/or store software component 210, at least one computing device (not illustrated in FIG. 2) within computing devices 202(1)-(N) may exclude and/or be free of software component 210 in alternative embodiments.

In one example, computing devices 208(1)-(N) may represent a group of known-clean devices that have never been infected by malware. In this example, computing devices 208(1) and 208(N) may include and/or store pluralities of benign singleton files 214 and 224, respectively. In addition, a threshold number of computing devices 208(1)-(N) may include and/or store a software component 212. Although FIG. 2 illustrates only computing devices 208(1)-(N) that include and/or store software component 212, one or more computing devices (not illustrated in FIG. 2) within computing devices 208(1)-(N) may exclude and/or be free of software component 212 in alternative embodiments.

In one example, computing device 216 may include and/or store software component 210. In this example, computing device 216 may represent an unvindicated device whose infection status is unknown and/or in question. Additionally or alternatively, computing device 216 may include and/or store a singleton file 218.

In one example, computing device 220 may include and/or store software component 210. In this example, computing device 220 may represent an unvindicated device whose infection status is unknown and/or in question. Additionally or alternatively, computing device 220 may include and/or store a singleton file 222.

In one embodiment, one or more of modules 102 from FIG. 1 may, when executed by at least one processor of server 206, enable server 206 to identify suspicious singleton files using correlational predictors. For example, and as will be described in greater detail below, one or more of modules 102 may cause server 206 to (1) identify known-clean computing devices 202(1)-(N) that include no singleton files, (2) detect software component 210 that is installed on a threshold number of known-clean computing devices 202(1)-(N), (3) identify unvindicated computing device 216 whose infection status is unknown and/or in question, (4) determine that, in addition to being installed on the threshold number of known-clean computing devices 202(1)-(N), software component 210 is installed on unvindicated computing device 216, (5) determine that unvindicated computing device 216 includes at least one singleton file 218, and then (6) classify singleton file 218 as suspicious in response to determining that (A) software component 210 is installed on unvindicated computing device 216 and (B) unvindicated computing device 216 includes singleton file 218.

Computing devices 202(1)-(N), 208(1)-(N), 216, and 220 each generally represents any type or form of computing device capable of reading computer-executable instructions. Examples of computing devices 202(1)-(N), 208(1)-(N), 216, and 220 include, without limitation, laptops, tablets, desktops, servers, cellular phones, Personal Digital Assistants (PDAs), multimedia players, embedded systems, wearable devices (e.g., smart watches, smart glasses, etc.), gaming consoles, variations or combinations of one or more of the same, exemplary computing system 510 in FIG. 5, or any other suitable computing devices.

Server 206 generally represents any type or form of computing device capable of determining correlational predictors and/or identifying suspicious singleton files using correlational predictors. Examples of server 206 include, without limitation, security servers, web servers, network devices (such as routers and/or switches), network servers, application servers, and/or database servers configured to run certain software applications and/or provide various security, web, networking, and/or database services. Although illustrated as a single entity in FIG. 2, server 206 may alternatively include and/or represent multiple servers running within exemplary system 200.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 600 in FIG. 6, or the like. Network 204 may facilitate communication or data transfer using wireless and/or wired connections. In one embodiment, network 204 may facilitate communication among computing devices 202(1)-(N), 208(1)-(N), 216, 220, and/or server 206.

Software components 210 and 212 each generally represent any type or form of software, application, and/or script capable of running on a computing device. Examples of software components 210 and 212 include, without limitation, compilers, development environments, security software, whitelisting software, blacklisting software, variations or combinations of one or more of the same, or any other suitable software components.

Singleton files 218 and 222 each generally represent any type or form of file that exists exclusively on a single computing device. In other words, singleton files 218 and 222 may each represent a unique instance of a particular file that exists on no other machine besides computing device 216 and computing device 220, respectively. In most examples, singleton files 218 and 222 may each include and/or represent an executable. Additionally or alternatively, singleton files 218 and 222 may facilitate and/or cause the execution of an executable. Examples of singleton files 218 and 222 include, without limitation, .EXE files, .DLL files, .APP files, .BAT files, .CGI files, .COM files, .GADGET files, .JAR files, .PIF files, .VB files, .WSF files, PYTHON scripts, binary code, machine code, variations or combinations of one or more of the same, and/or any other suitable singleton files.

Pluralities of benign singleton files 214 and 224 each generally represent any collection and/or cluster of singleton files that are known to be benign and/or non-malicious. In one example, singleton files 214 and 224 may be clustered together by a k-Nearest Neighbors (k-NN) algorithm (such as a scalable k-NN descent algorithm) or any other clustering algorithm. Examples of singleton files 214 and 224 include, without limitation, .EXE files, .DLL files, .APP files, .BAT files, .CGI files, .COM files, .GADGET files, .JAR files, .PIF files, .VB files, .WSF files, PYTHON scripts, binary code, machine code, variations or combinations of one or more of the same, and/or any other suitable singleton files.

Figure 3:
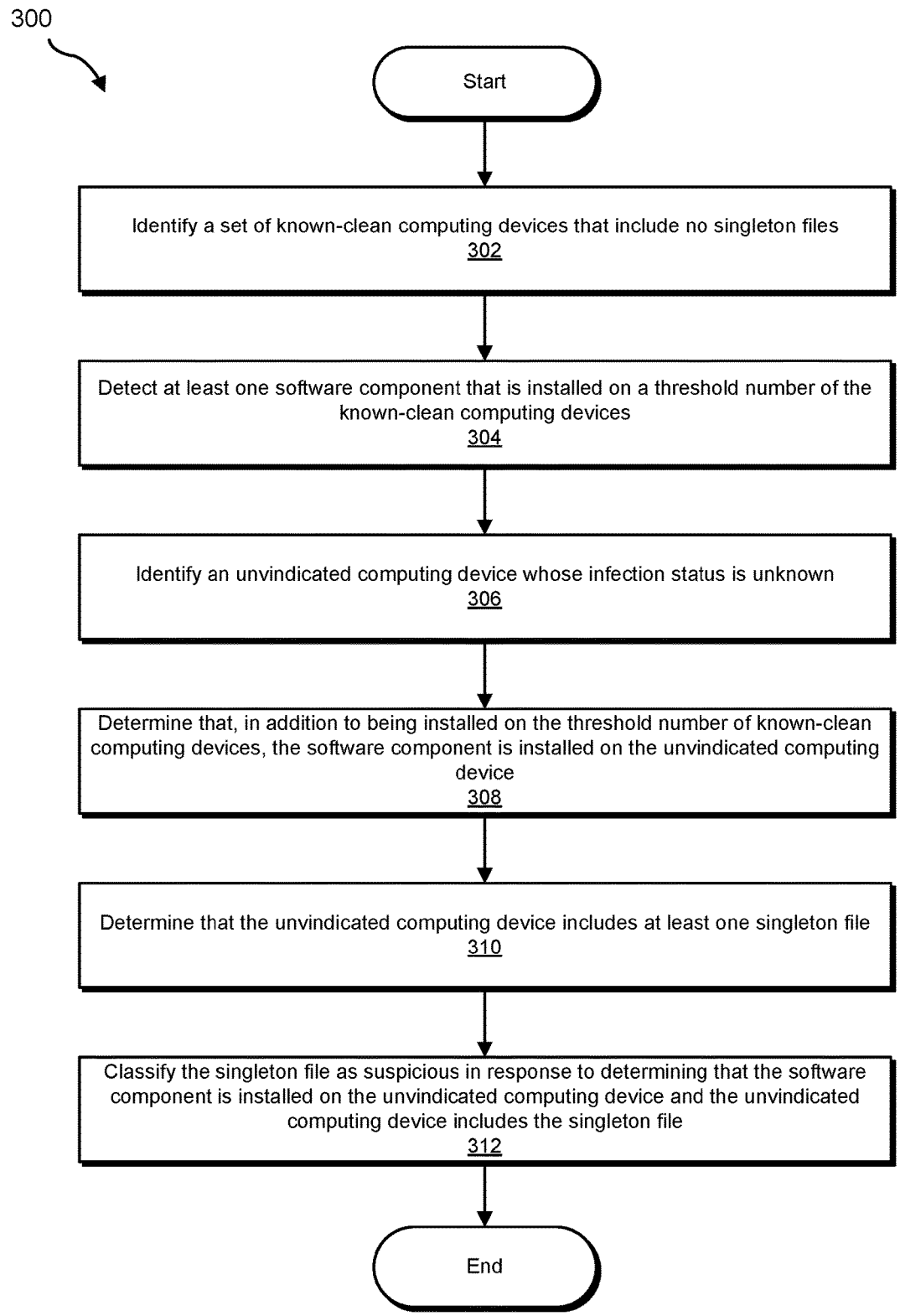
FIG. 3 is a flow diagram of an exemplary method for identifying suspicious singleton files using correlational predictors.

FIG. 3 is a flow diagram of an exemplary computer-implemented method 300 for identifying suspicious singleton files using correlational predictors. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 510 in FIG. 5, and/or portions of exemplary network architecture 600 in FIG. 6.

As illustrated in FIG. 3, at step 302 one or more of the systems described herein may identify a set of known-clean computing devices that include no singleton files. For example, identification module 104 may, as part of server 206 and/or computing devices 202(1)-(N), identify a set of known-clean computing devices 202(1)-(N) that include no singleton files. In this example, set of known-clean computing devices 202(1)-(N) may never have been infected and/or compromised by malware. The term "known-clean," as used herein in connection with a computing device, generally refers to the computing device's state of being clean of and/or uninfected by malware.

The systems described herein may perform step 302 in a variety of ways. In some examples, identification module 104 may identify known-clean computing devices 202(1)-(N) by identifying which computing devices within a security software vendor's customer base include no singleton files. For example, identification module 104 may identify a database that indicates which computing devices within a security software vendor's customer base include no singleton files. In this example, identification module 104 may group known-clean computing devices 202(1)-(N) together based at least in part on this attribute of having no singleton files.

Additionally or alternatively, identification module 104 may scan at least a portion of the computing devices within the security software vendor's customer base. During this scan, identification module 104 may identify computing devices 202(1)-(N) as having no singleton files. In this example, identification module 104 may group known-clean computing devices 202(1)-(N) together based at least in part on this attribute of having no singleton files.

In some examples, identification module 104 may identify known-clean computing devices 208(1)-(N) by identifying which computing devices within a security software vendor's customer base include no singleton files. For example, identification module 104 may identify a database that indicates which computing devices within the security software vendor's customer base include some singleton files. In this example, identification module 104 may group known-clean computing devices 208(1)-(N) together based at least in part on this attribute of having some singleton files. In one example, identification module 104 may group known-clean computing devices 208(1)-(N) together because they include many singleton files (e.g., enough singletons to reach a certain threshold).

Additionally or alternatively, while scanning the computing devices within the security software vendor's customer base, identification module 104 may identify computing devices 208(1) and 208(N) as having singleton files 214 and 224, respectively. In this example, identification module 104 may group known-clean computing devices 208(1)-(N) together based at least in part on this attribute of having some singleton files. In one example, identification module 104 may group known-clean computing devices 208(1)-(N) together because singleton files 214 and 224 are each high in number (e.g., above a certain threshold).

Returning to FIG. 3, at step 304 one or more of the systems described herein may detect at least one software component that is installed on a threshold number of the known-clean computing devices. For example, detection module 106 may, as part of server 206 and/or computing devices 202(1)-(N), detect software component 210 installed on a threshold number of computing devices 202(1)-(N). In other words, detection module 106 may determine that the number of computing devices 202(1)-(N) that include software component 210 is above a certain threshold.

In one example, software component 210 may include and/or represent a specific version of software. In another example, software component 210 may include and/or represent any portion or version of software within a certain family of software. Additionally or alternatively, software component 210 may include and/or represent any collection and/or combination of different software components.

The systems described herein may perform step 304 in a variety of ways. In some examples, detection module 106 may detect software component 210 by identifying the various software components installed and/or running on computing devices 202(1)-(N). For example, detection module 106 may identify a database that indicates which software components are installed and/or running on computing devices 202(1)-(N). In this example, detection module 106 may detect the presence of software component 210 on a threshold number of computing devices 202(1)-(N) based at least in part on the database. Additionally or alternatively, detection module 106 may recognize that software component 210 is installed on a threshold number of computing devices 202(1)-(N) based at least in part on the database.

Additionally or alternatively, detection module 106 may scan at least a portion of the computing devices within the security software vendor's customer base. During this scan, detection module 106 may detect the presence of software component 210 on a threshold number of computing devices 202(1)-(N). In this example, detection module 106 may make and/or recognize the correlation or association that software component 210 is often installed on computing devices that do not have any singleton files.

As a result, detection module 106 may determine that the presence of software component 210 on a particular computing device suggests that the computing device does not have any singleton files. Accordingly, the presence of software component 210 on a particular computing device may represent a predictor indicating that no singleton files are expected to exist on that computing device. In other words, in the event that software component 210 is installed on a particular computing device, no singleton files are expected to be found on that computing device.

In one example, detection module 106 may detect whether software component 210 is also installed on any of computing devices 208(1)-(N). In the event that software component 210 is installed on some of computing devices 208(1)-(N), determination module 108 may calculate a ratio between the number of computing devices 202(1)-(N) on which software component 210 is installed and the number of computing devices 208(1)-(N) on which software component 210 is installed. For example, determination module 108 may determine that software component 210 is installed on computing devices 202(1)-(N) and 208(1)-(N) at a ratio of 10:1. In this example, determination module 108 may determine that the ratio has reached a certain threshold (e.g., above 9:1) indicating that no singleton files are expected on any computing device that includes software component 210.

As a specific example, identification module 104 may identify a set of 1,000,000 known-clean computing devices that have no singletons and a set of 5,000,000 known-clean computing devices that have multiple singletons. Detection module 106 may detect the presence of a whitelisting software component on 20,000 of the computing devices that have no singletons and on 10,000 of the computing devices that have multiple singletons. Determination module 108 may then calculate the likelihood of the whitelisting software component being included on the computing devices that have no singletons at $$\frac{20,000}{1,000,000} = \frac{1}{50} = 2\%.$$

Similarly, determination module 108 may calculate the likelihood of the whitelisting software component being included on the computing devices that have multiple singletons at $$\frac{10,000}{5,000,000} = \frac{1}{500} = 0.2\%.$$

Accordingly, determination module 108 may calculate the resulting odds ratio at 10:1 in favor of an unvindicated computing device having no singletons in the event that the whitelisting software component is found on that unvindicated computing device.

In some examples, detection module 106 may detect software component 212 by identifying the various software components installed and/or running on computing devices 208(1)-(N). For example, detection module 106 may identify a database that indicates which software components are installed and/or running on computing devices 208(1)-(N). In this example, detection module 106 may detect the presence of software component 212 on a threshold number of computing devices 208(1)-(N) based at least in part on the database. Additionally or alternatively, detection module 106 may recognize that software component 212 is installed on a threshold number of computing devices 208(1)-(N) based at least in part on the database.

Additionally or alternatively, while scanning the computing devices within the security software vendor's customer base, detection module 106 may detect the presence of software component 212 on a threshold number of computing devices 208(1)-(N). In this example, detection module 106 may make and/or recognize the correlation or association that software component 212 is often installed on computing devices that include some or even many singleton files.

As a result, detection module 106 may determine that the presence of software component 212 on a particular computing device suggests that the computing device probably has at least some singleton files. Accordingly, the presence of software component 212 on a particular computing device may represent a predictor indicating that some singleton files are expected to exist on that computing device. In other words, in the event that software component 212 is installed on a particular computing device, some singleton files are expected to be found on that computing device.

In one example, detection module 106 may detect whether software component 212 is also installed on any of computing devices 202(1)-(N). In the event that software component 212 is installed on some of computing devices 202(1)-(N), detection module 106 may calculate a ratio between the number of computing devices 208(1)-(N) on which software component 212 is installed and the number of computing devices 202(1)-(N) on which software component 212 is installed. For example, determination module 108 may determine that software component 212 is installed on computing devices 208(1)-(N) and 202(1)-(N) at a ratio of 200:1. In this example, determination module 108 may determine that the ratio has reached a certain threshold indicating that some singleton files are expected on any computing device that includes software component 212.

As a specific example, identification module 104 may identify a set of 1,000,000 known-clean computing devices that have no singletons and a set of 5,000,000 known-clean computing devices that have multiple singletons. Detection module 106 may detect the presence of a compiler on 1,000 of the computing devices that have no singletons and on 100,000 of the computing devices that have multiple singletons. Determination module 108 may then calculate the likelihood of the compiler being included on the computing devices that have no singletons at $$\frac{1,000}{1,000,000} = \frac{1}{1000} = 0.1\%.$$

Similarly, determination module 108 may calculate the likelihood of the compiler being included on the computing devices that have multiple singletons at $$\frac{1,000,000}{5,000,000} = \frac{1}{5} = 20\%.$$

Accordingly, determination module 108 may calculate the resulting odds ratio at 200:1 in favor of an unvindicated computing device having multiple singletons in the event that the compiler is found on that unvindicated computing device.

Returning to FIG. 3, at step 306 one or more of the systems described herein may identify an unvindicated computing device whose infection status is unknown. For example, identification module 104 may, as part of server 206 and/or computing device 216, identify unvindicated computing device 216 whose infection status is unknown or in question. The term "unvindicated," as used herein in connection with a computing device, generally refers to the computing device's state of being under examination for malware and/or having a level of health that is unknown or unproven.

The systems described herein may perform step 306 in a variety of ways. In some examples, identification module 104 may identify unvindicated computing device 216 based at least in part on security scans. For example, computing device 216 may become and/or be deemed unvindicated every time that computing device 216 undergoes a security scan. In other words, the infection status of computing device 216 may be effectively reset every time that a security scan runs on computing device 216. As a specific example, identification module 104 may identify computing device 216 as being unvindicated at the outset of, during, and/or after a security scan that detects singleton file 218 on computing device 216.

In some examples, identification module 104 may identify unvindicated computing device 216 upon joining the security software vendor's customer base. For example, as computing device 216 joins the security software vendor's customer base, identification module 104 may identify computing device 216 as being unvindicated due at least in part to its need for a security scan.

In some examples, identification module 104 may identify unvindicated computing device 220 based at least in part on security scans. For example, computing device 220 may become and/or be deemed unvindicated every time that computing device 220 undergoes a security scan. In other words, the infection status of computing device 220 may be effectively reset to unvindicated, unknown, and/or unproven every time that a security scan runs on computing device 220. As a specific example, identification module 104 may identify computing device 220 as being unvindicated at the outset of, during, and/or after a security scan that detects singleton file 222 on computing device 220.

In some examples, identification module 104 may identify unvindicated computing device 220 upon joining the security software vendor's customer base. For example, as computing device 220 joins the security software vendor's customer base, identification module 104 may identify computing device 220 as being unvindicated due at least in part to its need for a security scan.

Returning to FIG. 3, at step 308 one or more of the systems described herein may determine that, in addition to being installed on the threshold number of known-clean computing devices, the software component is installed on the unvindicated computing device. For example, determination module 108 may, as part of server 206 and/or computing device 216, determine that software component 210 is installed on computing device 216. In this example, software component 210 may be correlated and/or associated with the absence of singleton files.

The systems described herein may perform step 308 in a variety of ways. In some examples, determination module 108 may determine that software component 210 is installed on computing device 216 by identifying the various software components installed and/or running on computing device 216. For example, determination module 108 may identify a database that indicates which software components are installed and/or running on computing device 216. In this example, determination module 108 may determine that the database indicates that software component 210 is installed on computing device 216.

Additionally or alternatively, determination module 108 may scan computing device 216 to determine the various software components installed and/or running on computing device 216. During this scan, determination module 108 may detect the presence of software component 210. As a result, determination module 108 may determine that no singleton files are expected on computing device 216 due at least in part to the correlation and/or associated between software component 210 and the lack of singletons.

In some examples, determination module 108 may determine that software component 212 is installed on computing device 220 by identifying the various software components installed and/or running on computing device 220. For example, determination module 108 may identify a database that indicates which software components are installed and/or running on computing device 220. In this example, determination module 108 may determine that the database indicates that software component 212 is installed on computing device 220.

Additionally or alternatively, determination module 108 may scan computing device 220 to determine the various software components installed and/or running on computing device 216. During this scan, determination module 108 may detect the presence of software component 210. As a result, determination module 108 may determine that some singleton files are expected on computing device 216 due at least in part to the correlation and/or associated between software component 212 and singletons.

Returning to FIG. 3, at step 310 one or more of the systems described herein may determine that the unvindicated computing device includes at least one singleton file. For example, determination module 108 may, as part of server 206 and/or computing device 216, determine that computing device 216 includes singleton file 218. In this example, determination module 108 may arrive at this determination even though computing device 216 is not expected to have any singleton files due at least in part to the presence of software component 210. Although FIG. 2 illustrates only one singleton file on computing device 216, alternative embodiments may involve additional singleton files on computing device 216.

The systems described herein may perform step 310 in a variety of ways. In some examples, determination module 108 may determine that computing device 216 includes singleton file 218 by identifying the various files stored on computing device 216. For example, determination module 108 may identify a database that specifies any singleton files stored on computing device 216. In this example, determination module 108 may detect the presence of singleton file 218 on computing device 216 based at least in part on the database.

Additionally or alternatively, determination module 108 may perform a security scan on computing device 216. During this scan, determination module 108 may identify singleton file 218 even though computing device 216 is not expected to have any singleton files due at least in part to the presence of software component 210.

In some examples, determination module 108 may determine that computing device 220 includes singleton file 222 by identifying the various files stored on computing device 220. For example, determination module 108 may identify a database that specifies any singleton files stored on computing device 220. In this example, determination module 108 may detect the presence of singleton file 222 on computing device 220 based at least in part on the database.

Additionally or alternatively, determination module 108 may perform a security scan on computing device 220. During this scan, determination module 108 may identify singleton file 222 among a group of singletons, which are expected to exist on computing device 220 due at least in part to the presence of software component 212. As a result, the presence alone of such singletons on computing device 220 may not give rise to much suspicion. Accordingly, additional suspicion analyses may be necessary to determine whether or not singleton file 222 is suspicious.

As a specific example, determination module 108 may determine whether certain attributes of singleton file 222 match any corresponding attributes of a cluster of benign singleton files that have been linked to software component 212. Examples such attributes include, without limitation, character strings included in file names of benign singleton files, character strings included in folder names in which benign singleton files are stored, file size metrics that represents sizes of benign singleton files, variations or combinations of one or more of the same, or any other suitable attributes. For example, security module 112 may cluster together singleton files 214 and 224 (along with various other singletons not illustrated in FIG. 2) using a k-NN algorithm (such as a scalable k-NN descent algorithm) or any other clustering algorithm. In this example, singleton files 214 and 224 may be known to be benign and located on computing devices that include software component 212.

Continuing with this example, security module 112 may divide the file names of the clustered singletons using chunking techniques. Additionally or alternatively, security module 112 may divide the folder names of the folders and/or directories that include the clustered singletons using chunking techniques. Examples of such chunking techniques include, without limitation, separating words by whitespace or punctuation, CamelCase capitalization transitions, transitions from alphabetical characters to numerical characters, Conditional Random Fields (CRFs), variations or combinations of one or more of the same, or any other suitable chunking techniques.

Upon dividing the file names of the singletons or the corresponding folder names in this way, security module 112 may apply stop-words elimination and/or inverse document frequency weighting to the singletons and then represent each singleton as a so-called "bag of words". In one example, security module 112 may compare certain singletons with one another to determine the level of similarity between the file names and/or folders names of the singletons. For example, security module 112 may use a binary vector to indicate the number of words that two singletons being compared to one another have in common. Security module 112 may then determine the level of similarity between the file names and/or folder names of the two singletons by dividing the number of words that the singletons have in common by the total number of words in both file names and/or folder names. Additionally or alternatively, security module 112 may create, from the so-called "bags of words" and binary vectors, a regular expression that facilitates identifying suspicious and/or innocuous patterns within file names and/or folder names of singletons encountered within the software security vendor's customer base.

As a specific example, security module 112 may create a regular expression 400 in FIG. 4. As illustrated in FIG. 4, regular expression 400 may include, identify, and/or account for a variety of words and/or chunks (in this example, "_ASP," ".NET," "APP_CODE," "APP_GlobalResources," "APP_LocalResources," "APP_Web," and "aspx") capable of facilitating the identification of suspicious and/or innocuous patterns within file names and/or folder names of singletons under examination.

In one example, identification module 104 may identify at least one attribute of singleton file 222 stored on computing device 216. Examples of such an attribute include, without limitation, the file name of a singleton file, the folder name of a folder that contains singleton file, the size of a singleton file, portions of one or more of the same, variations or combinations of the same, or any other suitable attribute.

As a specific example, identification module 104 may also identify singleton file information 402 in FIG. 4 that specifies certain attributes of singleton file 222. As illustrated in FIG. 4, singleton file information 402 may include and/or identify a file name (in this example, "App_Web_example.dfa854d52701.exe") and/or a file path (in this example, "C:\WINDOWS\Microsoft.NET\Framework\v4.0.30319\APP_CODE\") of a singleton file (in this example, "Singleton File 222"). Determination module 108 may then determine that singleton file 222 is benign due at least in part to the file name and/or file path identified in singleton file information 402 including certain words and/or chunks identified or accounted for in regular expression 400. In other words, singleton file 222 may represent and/or amount to a type of singleton that is expected to exist on a computing device that includes software component 212.

In another example, identification module 104 may identify at least one attribute of another singleton file (not illustrated in FIG. 2) that exists on a computing device that includes software component 212. In this example, identification module 104 may identify the file name and/or file path of this singleton file. As a specific example, identification module 104 may identify the singleton's file name as "SuspiciousExample.exe" and its file path as "C:\Program Files\BIN\". Determination module 108 may then determine that this singleton file is suspicious due at least in part to the file name and/or file path not having a sufficient number of words and/or chunks identified or accounted for in regular expression 400. In other words, this singleton file may represent and/or amount to a type of singleton that is not expected to exist on a computing device that includes software component 212.

Returning to FIG. 3, at step 312 one or more of the systems described herein may classify the singleton file as suspicious in response to determining that the software component is installed on the unvindicated computing device and the unvindicated computing device includes the singleton file. For example, classification module 110 may, as part of server 206 and/or computing device 216, classify singleton file 218 as suspicious in response to the determinations that software component 210 is installed on computing device 216 and that computing device 216 includes singleton file 218. In other words, this classification may arise from the satisfaction of at least two criteria: (1) software component 210, which has been correlated and/or associated with the absence of singletons, is installed on computing device 216 and (2) computing device 216 includes singleton file 218.

The systems described herein may perform step 312 in a variety of ways. In some examples, classification module 110 may classify singleton file 218 by marking singleton file 218 as suspicious. Additionally or alternatively, classification module 110 may identify metadata of singleton file 218 and then note, within the metadata, that singleton file 218 is suspicious. Moreover, classification module 110 may notify security module 112 that singleton file 218 is suspicious and/or warrants an increased level of scrutiny with respect to future security operations.

In some examples, classification module 110 may classify singleton file 222 by marking singleton file 218 as benign. Additionally or alternatively, classification module 110 may identify metadata of singleton file 218 and then note, within the metadata, that singleton file 222 is benign. Moreover, classification module 110 may notify security module 112 that singleton file 218 is benign and/or does not warrant an increased level of scrutiny with respect to future security operations.

In some examples, the classification of being suspicious may lead to and/or result in an increased level of scrutiny and/or more aggressive monitoring. For example, security module 112 may, as part of as part of server 206 and/or computing device 216, subject singleton file 218 to an increased level of scrutiny due at least in part to the singleton file's classification as suspicious. In one example, security module 112 may perform additional analyses on singleton file 218 that potentially provide, in conjunction with the suspicious classification, a sufficient basis upon which singleton file 218 can be fully convicted as malware or fully vindicated as benign.

In some examples, security module 112 may create a classifier that facilitates classifying singleton files as suspicious or benign. In such examples, security module 112 may train the classifier with training data that accounts for software component 210 being installed on a threshold number of computing devices 202(1)-(N) that include no singleton files. Additionally or alternatively, the training data may account for software component 212 being installed on a threshold number of computing devices 208(1)-(N) that include various singleton files.

As explained above in connection with FIGS. 1-4, security software systems may be able to identify suspicious singleton files using correlational predictors. For example, a security software system may detect software components s10, s13, and s18 on a computing device. In this example, the security software system may compute the probability of the computing device having singletons using Naïve Bayes assumptions. In particular, the security software system may compute $$P(\text{Singletons} | s10, s13, \text{ and } s18) = \frac{P(s10 | \text{Singletons})P(s13 | \text{Singletons})P(s18 | \text{Singletons})P(\text{Singletons})}{P(s10, s13, s18)} \text{ and}$$

$$P(\text{No} - \text{Singletons} | s10, s13, \text{ and } s18) = \frac{P(s10 | \text{No} - \text{Singletons})P(s13 | \text{No} - \text{Singletons})P(s18 | \text{No} - \text{Singletons})P(\text{No} - \text{Singletons})}{P(s10, s13, s18)}.$$

Continuing with this example, the security software system may observe which of these equations produces a larger result. In the event that the P(Singletons|s10, s13, and s18) equation produces the larger result, the security software system may expect to find singletons on the computing device. In the event that the P(No—Singletons|s10, s13, and s18) equation produces the larger result, the security software system may expect to find no singletons on the computing device. In this example, the security software system may not need to compute P(s10, s13, s18) because that portion is included in both equations. In addition, the security software system may estimate P(s10|No—Singletons) using a maximum-likelihood estimation that represents the percentage of time that s10 is found on singleton-free computing devices. The security software system may apply Laplace smoothing to the maximum-likelihood estimation to smoothen the estimation.

Figure 5:
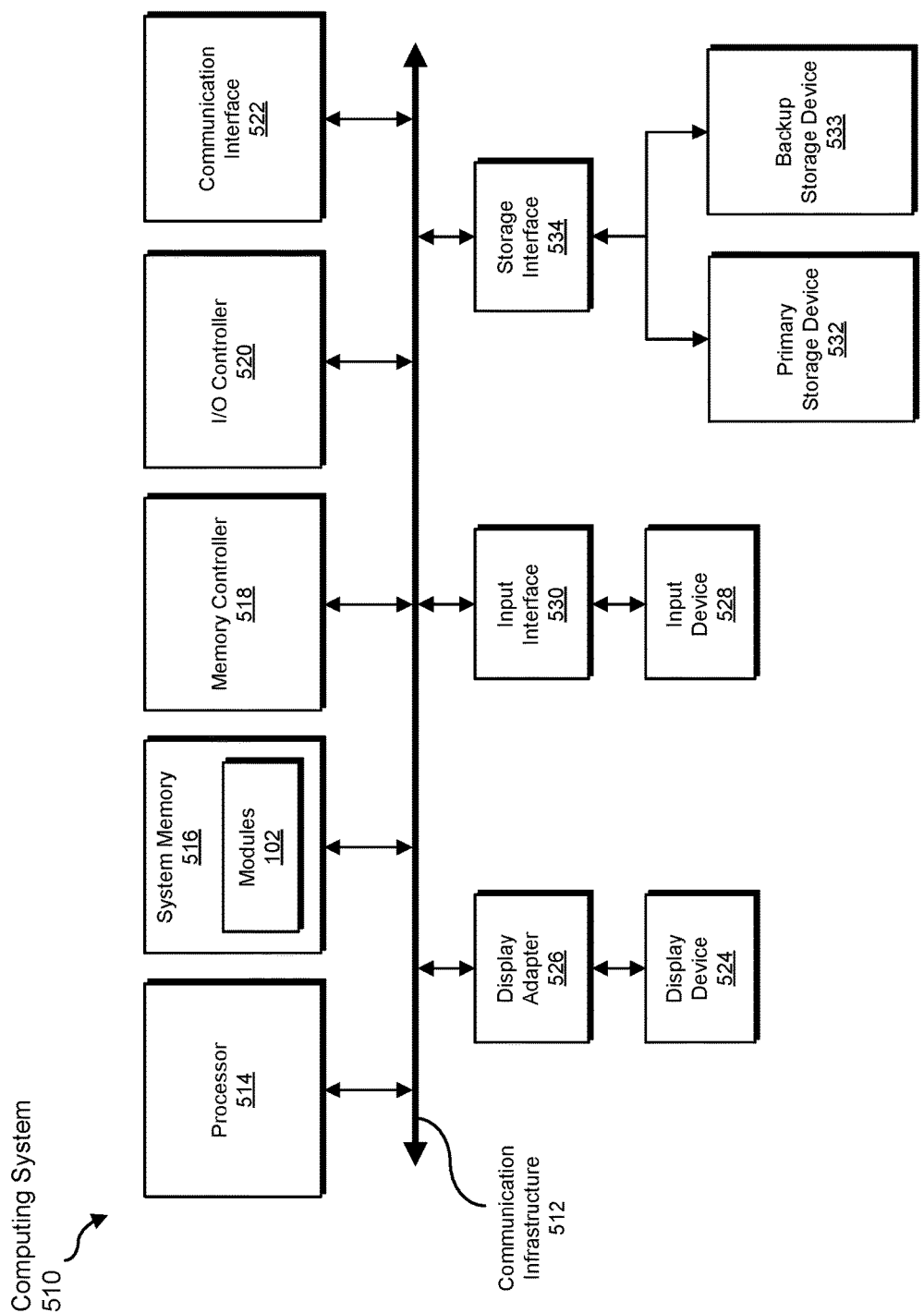
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. For example, all or a portion of computing system 510 may perform and/or be a means for performing, either alone or in combination with other elements, one or more of the steps described herein (such as one or more of the steps illustrated in FIG. 3). All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of physical processing unit (e.g., a hardware-implemented central processing unit) capable of processing data or interpreting and executing instructions. In certain embodiments, processor 514 may receive instructions from a software application or module. These instructions may cause processor 514 to perform the functions of one or more of the exemplary embodiments described and/or illustrated herein.

System memory 516 generally represents any type or form of volatile or non-volatile storage device or medium capable of storing data and/or other computer-readable instructions. Examples of system memory 516 include, without limitation, Random Access Memory (RAM), Read Only Memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an Industry Standard Architecture (ISA), Peripheral Component Interconnect (PCI), PCI Express (PCIe), or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an Application Specific Integrated Circuit (ASIC) adapted to implement one or more of the exemplary embodiments disclosed herein.

Figure 6:
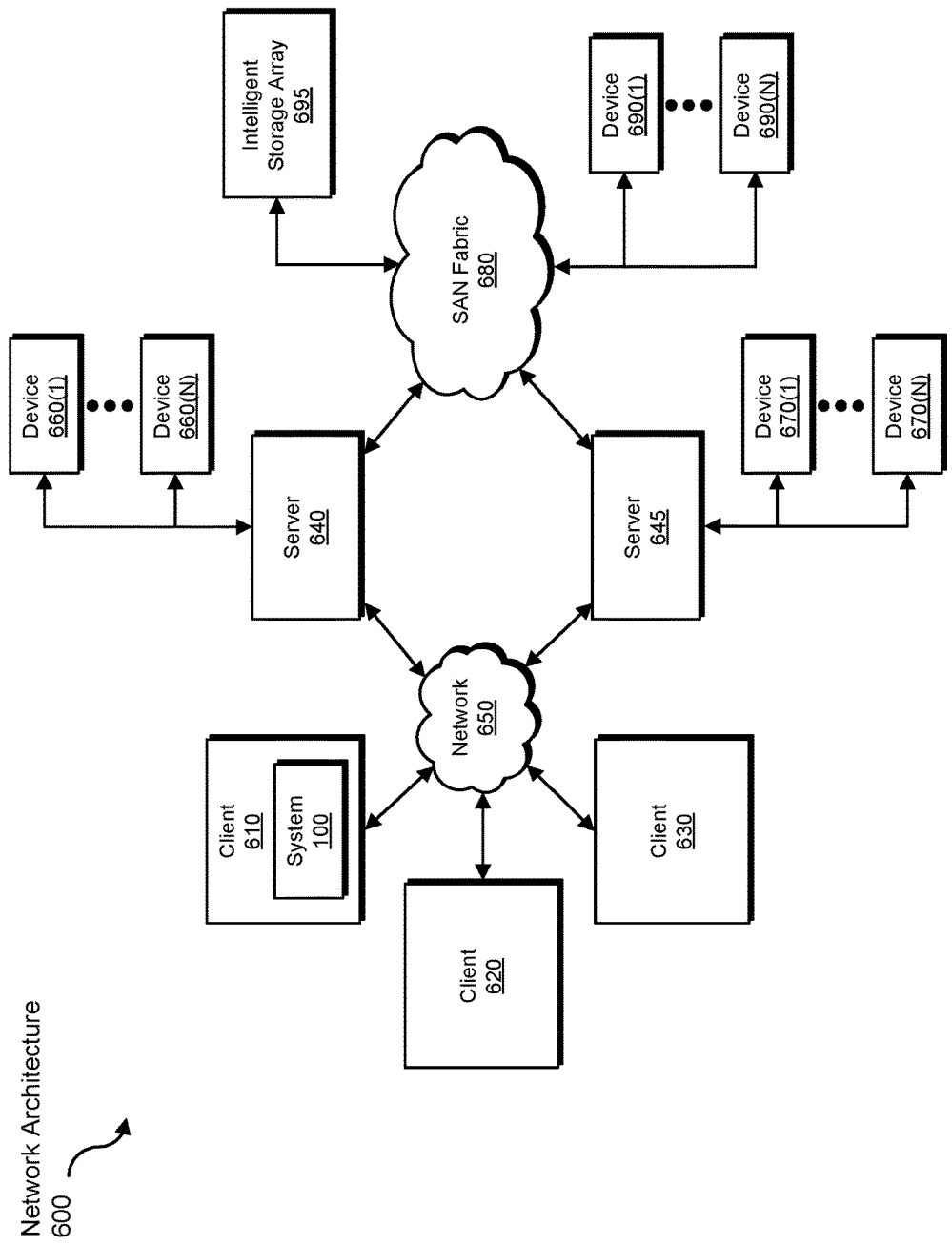
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the steps disclosed herein (such as one or more of the steps illustrated in FIG. 3). All or a portion of network architecture 600 may also be used to perform and/or be a means for performing other steps and features set forth in the instant disclosure.

Client systems 610, 620, and 630 generally represent any type or form of computing device or system, such as exemplary computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a WAN, a LAN, a PAN, or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent Network-Attached Storage (NAS) devices configured to communicate with servers 640 and 645 using various protocols, such as Network File System (NFS), Server Message Block (SMB), or Common Internet File System (CIFS).

Servers 640 and 645 may also be connected to a Storage Area Network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-

(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an exemplary method for identifying suspicious singleton files using correlational predictors.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for identifying suspicious singleton files using correlational predictors, at least a portion of the method being performed by a computing device comprising at least one processor, the method comprising:
    identifying a set of known-clean computing devices that:
        include no singleton files; and
        are not infected by malware;
    detecting at least one software component that is installed on a threshold number of the known-clean computing devices;
    correlating, based on an analysis of the set of known-clean computing devices, that computing devices are benign when the computing devices have at least one software component installed and do not include singleton files;
    identifying an unvindicated computing device whose infection status is unknown;
    determining that, in addition to being installed on the threshold number of the known-clean computing devices, the software component is installed on the unvindicated computing device;
    determining that the unvindicated computing device includes at least one singleton file; and
    classifying the singleton file as suspicious in response to determining that:
        the software component is installed on the unvindicated computing device; and
        the unvindicated computing device includes the singleton file; and
    in response to classifying the singleton file as suspicious, performing a security action with respect to the singleton file.

2. The method of claim 1, further comprising identifying an additional set of known-clean computing devices that include a plurality of singleton files; and
    wherein detecting the software component that is installed on the threshold number of the known-clean computing devices comprises:
        detecting whether the software component is installed on any of the known-clean computing devices that include the plurality of singleton files;
        calculating a ratio between the set of known-clean computing devices on which the software component is installed and the additional set of known-clean computing devices on which the software component is installed; and
        determining that the ratio has reached a certain threshold.

3. The method of claim 1, wherein:
    determining that the software component is installed on the unvindicated computing device comprises determining, based at least in part on the software component being installed on the unvindicated computing device, that the unvindicated computing device is not expected to include any benign or malicious singleton files; and
    determining that the unvindicated computing device includes the singleton file comprises determining that the unvindicated computing device includes the singleton file even though the unvindicated computing device is not expected to include any benign or malicious singleton files.

4. The method of claim 1, wherein classifying the singleton file as suspicious comprises subjecting the singleton file to an increased level of scrutiny due at least in part to the singleton file's classification as suspicious.

5. The method of claim 1, further comprising:
    identifying an additional set of known-clean computing devices that include a plurality of singleton files;
    detecting at least one additional software component that is installed on a threshold number of the known-clean computing devices that include the plurality of singleton files;
    identifying an additional unvindicated computing device whose infection status is unknown;
    determining that, in addition to being installed on the threshold number of known-clean computing devices that include the plurality of singleton files, the additional software component is installed on the additional unvindicated computing device;
    determining that the additional unvindicated computing device includes at least one additional singleton file; and
    in response to determining that the additional unvindicated computing device includes the additional singleton file, performing at least one additional suspicion analysis on the additional singleton file to determine whether the additional singleton file is suspicious.

6. The method of claim 5, wherein the additional suspicion analysis comprises:
   identifying at least one attribute of the additional singleton file included on the additional unvindicated computing device; and
   determining whether the attribute of the additional singleton file matches at least one attribute of a cluster of benign singleton files that have been linked to the additional software component.

7. The method of claim 6, wherein determining whether the attribute of the additional singleton file matches the attribute of the cluster of benign singleton files comprises:
   determining that the attribute of the additional singleton file does not match the attribute of the cluster of benign singleton files; and
   in response to determining that the attribute of the additional singleton file does not match the attribute of the cluster of benign singleton files, classifying the additional singleton file as suspicious.

8. The method of claim 7, wherein:
   determining that the additional software component is installed on the additional unvindicated computing device comprises determining, based at least in part on the additional software component being installed on the additional unvindicated computing device, that the additional unvindicated computing device is expected to include only singleton files that have the attribute of the cluster of benign singleton files;
   determining that the additional unvindicated computing device includes the additional singleton file comprises determining that the additional unvindicated computing device includes the additional singleton file even though the unvindicated computing device is expected to include only singleton files that have the attribute of the cluster of benign singleton files; and
   classifying the additional singleton file as suspicious comprises classifying the additional singleton file as suspicious due at least in part to:
      the unvindicated computing device being expected to include only singleton files that have the attribute of the cluster of benign singleton files; and
      the additional singleton file not having the attribute of the cluster of benign singleton files.

9. The method of claim 6, wherein determining whether the attribute of the additional singleton file matches the attribute of the cluster of benign singleton files comprises:
   determining that the attribute of the additional singleton file matches the attribute of the cluster of benign singleton files; and
   in response to determining that the attribute of the additional singleton file matches the attribute of the cluster of benign singleton files, classifying the additional singleton file as benign.

10. The method of claim 6, wherein the attribute of the cluster of benign singleton files comprises:
   a character string included in file names of the benign singleton files;
   a character string included in folder names in which the benign singleton files have been identified; and
   a file size metric that represents sizes of the benign singleton files.

11. A system for identifying suspicious singleton files using correlational predictors, the system comprising:
   an identification module, stored in memory, that:
      identifies a set of known-clean computing devices that:
         include no singleton files; and
         are not infected by malware;
      correlates, based on an analysis of the set of known-clean computing devices, that computing devices are benign when the computing devices have at least one software component installed and do not include singleton files;
      identifies an unvindicated computing device whose infection status is unknown;
   a detection module, stored in memory, that detects the at least one software component that is installed on a threshold number of the known-clean computing devices;
   a determination module, stored in memory, that:
      determines that, in addition to being installed on the threshold number of the known-clean computing devices, the software component is installed on the unvindicated computing device; and
      determines that the unvindicated computing device includes at least one singleton file;
   a classification module, stored in memory, that classifies the singleton file as suspicious in response to determining that:
      the software component is installed on the unvindicated computing device; and
      the unvindicated computing device includes the singleton file; and
   a security module, stored in memory, that performs a security action with respect to the singleton file in response to the singleton file being classified as suspicious; and
   at least one physical processor configured to execute the identification module, the detection module, the determination module, the classification module, and the security module.

12. The system of claim 11, wherein:
   the identification module identifies an additional set of known-clean computing devices that include a plurality of singleton files;
   the detection module detects whether the software component is installed on any of the known-clean computing devices that include the plurality of singleton files; and
   the determination module:
      calculates a ratio between the set of known-clean computing devices on which the software component is installed and the additional set of known-clean computing devices on which the software component is installed; and
      determines that the ratio has reached a certain threshold.

13. The system of claim 11, wherein:
   the determination module:
      determines, based at least in part on the software component being installed on the unvindicated computing device, that the unvindicated computing device is not expected to include any benign or malicious singleton files; and
      determines that the unvindicated computing device includes the singleton file even though the unvindicated computing device is not expected to include any benign or malicious singleton files.

14. The system of claim 11, further comprising a security module, stored in memory, that subjects the singleton file to an increased level of scrutiny due at least in part to the singleton file's classification as suspicious; and
   wherein the physical processor is further configured to execute the security module.

15. The system of claim 14, further comprising:
the identification module identifies an additional set of known-clean computing devices that include a plurality of singleton files;
the detection module detects at least one additional software component that is installed on a threshold number of the known-clean computing devices that include the plurality of singleton files;
the identification module identifies an additional unvindicated computing device whose infection status is unknown;
the determination module:
determines that, in addition to being installed on the threshold number of known-clean computing devices that include the plurality of singleton files, the additional software component is installed on the additional unvindicated computing device; and
determines that the additional unvindicated computing device includes at least one additional singleton file; and
the security module performs, in response to the determination that the additional unvindicated computing device includes the additional singleton file, at least one additional suspicion analysis on the additional singleton file to determine whether the additional singleton file is suspicious.

16. The system of claim 15, wherein the additional suspicion analysis comprises:
identifying at least one attribute of the additional singleton file included on the additional unvindicated computing device; and
determining whether the attribute of the additional singleton file matches at least one attribute of a cluster of benign singleton files that have been linked to the additional software component.

17. The system of claim 16, wherein:
the determination module determines that the attribute of the additional singleton file does not match the attribute of the cluster of benign singleton files; and
the classification module classifies the additional singleton file as suspicious in response to the determination that the attribute of the additional singleton file does not match the attribute of the cluster of benign singleton files.

18. The system of 17, wherein:
the determination module:
determines, based at least in part on the additional software component being installed on the additional unvindicated computing device, that the additional unvindicated computing device is expected to include only singleton files that have the attribute of the cluster of benign singleton files; and
determining that the additional unvindicated computing device includes the additional singleton file even though the unvindicated computing device is expected to include only singleton files that have the attribute of the cluster of benign singleton files; and
the classification module classifies the additional singleton file as suspicious due at least in part to:
the unvindicated computing device being expected to include only singleton files that have the attribute of the cluster of benign singleton files; and
the additional singleton file not having the attribute of the cluster of benign singleton files.

19. A non-transitory computer-readable medium comprising one or more computer-executable instructions that, when executed by at least one processor of a computing device, cause the computing device to:
identify a set of known-clean computing devices that:
include no singleton files; and
are not infected by malware;
detect at least one software component that is installed on a threshold number of the known-clean computing devices;
correlate, based on an analysis of the set of known-clean computing devices, that computing devices are benign when the computing devices have the at least one software component installed and do not include singleton files;
identify an unvindicated computing device whose infection status is unknown;
determine that, in addition to being installed on the threshold number of the known-clean computing devices, the software component is installed on the unvindicated computing device;
determine that the unvindicated computing device includes at least one singleton file; and
classify the singleton file as suspicious in response to determining that:
the software component is installed on the unvindicated computing device; and
the unvindicated computing device includes the singleton file; and
perform a security action with respect to the singleton file in response to the singleton file being classified as suspicious.

20. The method of claim 1, wherein the security action comprises one or more of:
increasing a level of scrutiny of the singleton file;
increasing monitoring of the singleton file;
performing additional analyses on the singleton file; and
convicting the singleton file as malware.

* * * * *